Patented Nov. 6, 1945

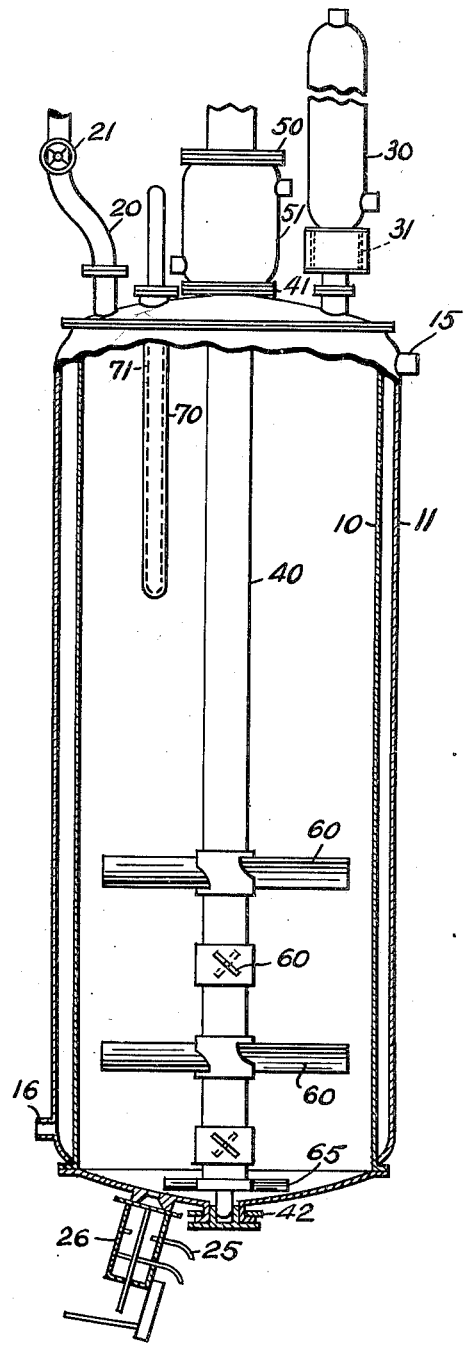

2,388,602

UNITED STATES PATENT OFFICE 2,388,602

POLYMERIZATION OF VINYL ESTERS IN EMULSION

Mogens Kiar, Shawinigan Falls, Quebec, Canada, assignor to Shawinigan Chemicals Limited, Montreal, Quebec, Canada, a corporation of Canada Application September 4, 1942, Serial No. 457,339 In Canada July 28, 1942

6 Claims. (Cl. 260—8)

INTRODUCTION

This invention relates to the manufacture of vinyl ester polymers in emulsion. More particularly it relates to methods for controlling the polymerization so that predetermined characteristics may be imparted to the resulting emulsion and polymer.

For practical purposes, polyvinyl esters of different viscosities, in view of the different characteristics they exhibit and consequently the different purposes for which they are respectively useful, must be considered as different resins although of the same type. For instance, a polyvinyl ester having a viscosity of say 150 centipoises (the viscosity at 20° C. of one molar solution of the polymer in benzene) is of no value for some purposes for which a vinyl ester having a viscosity of say 45 centipoises is required. This applies equally to these resins over the entire viscosity range.

The polymerization of vinyl esters in emulsion is, of course, not new itself. Various processes have been disclosed in which this result can be achieved in aqueous emulsion in the presence of a suitable emulsifier, catalyst and other agents. By following these methods polymerization may be carried out, but varying polymer viscosities will result. These methods suggest the use of various emulsifying agents and of various concentrations of the constituents, which have the effect of complicating the problem of achieving any predetermined characteristics in the resulting polymer. The prior art is silent as to the accurate control of the conversion under commercially applicable conditions so as to obtain at will polymers of predetermined viscosities. For commercial purposes, such control is essential.

The applicant has found that carrying out a commercial process for manufacturing polyvinyl esters in emulsion is conditional on a number of interdependent factors, the regulation of which is by no means within the knowledge of one skilled in the art. When certain factors are adjusted in a manner which might be gathered from the art to achieve changes in viscosity, other factors are thrown out of control with indeterminate results. When on the other hand, attempts are made to control these other factors, the time of reaction is extended beyond practical limits or some other factor is thrown out of control to the detriment of the resulting product.

Among the factors which the applicant has found important in the particular process for controlling the characteristics of the polymer are the following: (a) reaction time, (b) reflux rate, (c) concentration of catalyst, and accelerator if any, (d) nature and concentration of dispersing agents, (e) surface tension, (f) stirring speed, (g) presence or absence of modifying agents, and (h) purity of the starting material. Variations in these conditions not only cause variations in other conditions, but also affect the characteristics of the resulting polymer. It is thus evident that control to obtain a predetermined result is a complex problem.

OBJECTS

Having regard to the foregoing, principal objects of the invention are to provide a process of polymerizing vinyl esters in emulsion in which the reaction may be controlled to a predetermined pattern; a process of this nature in which polymers having predetermined characteristics may be obtained at will; a process of this nature in which the time of conversion is within practical commercial limits; a process of this nature in which economical concentrations of constituents are employable; dispersions and stable emulsions of polyvinyl esters having definite polymer viscosities.

THE INVENTION

These objects and others are accomplished as will be briefly outlined in principle as follows, individual steps being discussed later in more detail.

It is presumed for the moment that the applicant is desirous of producing a substantially uncontaminated stable emulsion containing a substantially colorless polymer. An emulsion is formed in a reflux apparatus by addition of emulsifier and preferably a surface tension depressant, monomer and catalyst to an aqueous medium while stirring. As will be explained, the concentration of the various constituents is regulated to achieve the specific result desired as regards control of the reaction and of the characteristics of the resulting polymer. The temperature of the charge is raised by adjusting the jacket temperature of the reflux apparatus until eventually the reaction commences and reflux starts at a temperature of about 66° C. Reflux is kept substantially at a minimum by use of a moderate catalyst concentration and regulation of the temperature through the jacket until the reaction is completed with the conversion of substantially all of the monomer. While stirring is continued, the charge is cooled.

The stability of the emulsion throughout this process is maintained by the choice of a suitable emulsifier (of which, as will be seen, different types can be used) by appropriate stirring and by the maintenance of reflux substantially at a minimum. The polymer viscosity is controlled principally by regulation of the catalyst concentration. Hydrogen peroxide is the preferred catalyst and should be supplemented by an accelerator.

The applicant has discovered that aqueous dispersions containing polymers of predetermined high viscosity (that is, above about 150 cps.) can be obtained within commercially practical time limits by adjusting the concentration of the catalyst and if the latter is hydrogen peroxide, of the accelerator. Polymers of lower viscosity cannot be obtained in this manner, since at the high concentration of catalyst necessary the reaction is thrown out of control. However, the applicant has discovered that dispersions containing low viscosity polymers can be produced by the use of a controlling agent which prevents the reaction being thrown out of control. Surprisingly, the adjustment at very low concentrations of the amount of controlling agent enables the polymer viscosity to be varied within fine limits. The controlling agents effective are aldehydic bodies, preferably acetaldehyde.

In order to explain the invention further, before dealing with specific variables encountered, examples will now be given of several actual procedures developed by the applicant. It will be understood, however, that these are not to be taken in a limiting sense, but merely as illustrating the methods described elsewhere in principle.

Examples

In the procedures described a reflux apparatus is employed of the type shown in the drawing. This apparatus consists of a cylindrical aluminum kettle 10 including a jacket 11. The jacket includes an inlet 15 and an outlet 16 to permit circulation of a temperature regulating liquid. The kettle is provided with a charge line 20 controlled by a valve 21. The kettle also includes a discharge line 25 controlled by a valve 26. Connected to the top of the kettle is a reflux condenser 30 provided with a sight glass 31. Extending downwards within the kettle is an agitator shaft 40, journaled in a bearing 41 at the top of the kettle and another 42 at the bottom thereof. Surrounding the shaft, adjacent its entrance into the kettle is a stuffing box 50 and a shaft condenser 51. Mounted near the lower end of the shaft are a series of spaced apart agitator blades 60 set for downward thrust and adjacent the bottom of the kettle a smaller agitator blade 65. The shaft is driven remotely from the kettle by a belt drive from an electric motor. Provision is made for varying the speed of the shaft over the operative range desired.

The characteristics and dimensions of the part of the apparatus used for the runs given in the examples are approximately as follows:

Kettle 10 (inside dimensions):
 Diameter _____ 18″
 Height _____ 48″
 Running charge _____ 250 lbs.
Stirrer shaft 16 (stainless
 steel) _____ 1½″ (diameter)
Agitator blades 60 (set at 45°
 for downward thrust, adjacent pairs being set at
 90° to each other) _____ 2½″ x 5″ (area)
Agitator blades 65_____ 1″ x 1½″ (area)
Reflux condenser 30_____ 1″ tube, 48″ long In accordance with the nature of the constituents of the charge and substantially the proportions set out in Table I, an aqueous solution of the emulsifier is charged into the reflux apparatus and the agitator started. The catalyst, the accelerator (in the case of hydrogen peroxide) and the balance of the water are introduced. About two minutes stirring are allowed before the monomeric vinyl acetate is added at the rate of approximately 20 lbs. per minute. The whole charge is now agitated for about 5 minutes in the cold to complete the emulsification of the monomer. Stirring is continued and the temperature of the jacket is raised to about 70° C. and maintained at this temperature until the temperature of the charge reaches about 66° C. Then, as the reaction gathers momentum and the reflux commences, the temperature of the jacket is gradually and suitably reduced in order to maintain a minimum of reflux (approximate rate, 1 gallon per hour). Reflux is used principally as an indication that the reaction is proceeding. Depending on the activity of the vinyl acetate, and on the concentration of catalyst and accelerator if any, it is necessary finally to reduce the temperature of the jacket to about 40° C. to about 55° C. at the peak of the reaction in order to regulate the reflux to the low rate. When the temperature of the charge has reached about 70° C. the temperature of the jacket is gradually raised from its minimum to about 82° C. Thus, as the temperature of the charge increases the reflux slows up and the temperature of the charge follows closely behind that of the jacket. When they are equal at about 82° C. the reflux ceases. The charge is then cooled down, with stirring, preferably to about 25° C. The agitator is then stopped and the batch of finished emulsion discharged. Where hydrogen peroxide is employed as the catalyst along with an accelerator, the pH of the charge is adjusted prior to the start of the reaction to between about 6.5 and about 7.5. Then, the pH at the end of the reaction should be in the neighborhood of 5.

Examples 1–18

For the examples of Table I, Nos. 1–18, the nature and concentrations of various constituents of the charge are approximately as follows:

Emulsifiers:
 Gum tragacanth _____per cent__ 1.25
 Hydrolyzed p. v. a. (having an acetate
  group content of 35%, made from
  a polyvinyl acetate of viscosity 7
  cps.) _____per cent__ 1.50
Surface tension depressant: "Aerosol O. T."
  per cent__ .1
City water _____do____ 42.55
Vinyl acetate _____do____ 56.60
Stirring speed _____R. P. M__ 535

¹ Taken by weight on the total charge.

Examples 1–16 demonstrate the control of polymer viscosity by manipulation of the concentration of the hydrogen peroxide catalyst, accelerator and controlling agent to achieve differing viscosities while other factors are kept more or less constant. The concentrations of the catalyst are given in approximate percents by weight of the monomer. The accelerator (sodium bicarbonate) and the controlling agent (acetaldehyde) are given approximately in percents by weight of the total charge.

Table I

| Ex. No. | Catalyst | | Accelerator, sodium bicarbonate | Controller, acetaldehyde | Approximate polymer viscosity | Approximate time |
|---|---|---|---|---|---|---|
| | Hydrogen peroxide | Available oxygen | | | | |
| | | *Percent* | | | | |
| 1 | 1.00 | 0.470 | 0.30 | 3.00 | 1.5 | 2-2½ hrs. |
| 2 | 0.50 | 0.235 | 0.20 | 2.00 | 2.5 | 2-2½ hrs. |
| 3 | 0.25 | 0.117 | 0.10 | 1.00 | 7.0 | 2-2½ hrs. |
| 4 | 0.15 | 0.070 | 0.07 | 0.75 | 15.0 | 2-2½ hrs. |
| 5 | 0.10 | 0.047 | 0.05 | 0.50 | 25.0 | 2-2½ hrs. |
| 6 | 0.04 | 0.018 | 0.05 | 0.10 | 45.0 | 2-2½ hrs. |
| 7 | 0.04 | 0.018 | 0.05 | 0.075 | 60.0 | 2-2½ hrs. |
| 8 | 0.04 | 0.018 | 0.05 | 0.05 | 100.0 | 2-2½ hrs. |
| 9 | 0.04 | 0.018 | 0.05 | 0.03 | 125.0 | 2-2½ hrs. |
| 10 | 0.04 | 0.018 | 0.05 | | 150.0 | 2-2½ hrs. |
| 11 | 0.038 | 0.017 | 0.05 | | 175.0 | 2-2½ hrs. |
| 12 | 0.036 | 0.016 | 0.05 | | 200.0 | 2-2½ hrs. |
| 13 | 0.033 | 0.015 | 0.05 | | 225.0 | 2-2½ hrs. |
| 14 | 0.030 | 0.014 | 0.05 | | 250.0 | 2-2½ hrs. |
| 15 | 0.025 | 0.012 | 0.04 | | 275.0 | 2-2½ hrs. |
| 16 | 0.02 | 0.010 | 0.03 | | 300.0 | 2-2½ hrs. |
| 17 | 0.40 | | 0.14 | | 7.0 | ½ hr. (uncontrollable). |
| 18 | 0.10 | | 0.05 | | 60.0 | 1¼ hrs. (uncontrollable). |

The emulsion manufactured according to each of Examples 1 to 16 is stable, permanently for all practical purposes under normal conditions of storage and handling. Hydrolysis of the monomer during polymerization is less than about 1%. The residual monomeric vinyl acetate is reduced to a minimum being in no example over about 2%. The viscosity of the emulsions runs between about 125 cps. and about 150 cps. Examples 17 and 18 are controls showing conditions which produce unstable emulsions.

Films laid down from these stable emulsions are unexpectedly pliable and non-blocking.

EXAMPLES 19 TO 22

The examples given in the following Table II illustrate the effect of different aldehydes as compared with acetaldehyde. The conditions were substantially the same as for the examples given in Table I with the exception that the catalyst was present in all cases at a concentration of about .035% and the accelerator at a concentration of about .05%. The concentrations of the aldehydes were approximately those indicated in the table.

Table II

| Ex. No. | Controlling agent | Concentration | Approximate polymer viscosity | Approximate time |
|---|---|---|---|---|
| | | *Percent* | | *Hours* |
| 19 | Acetaldehyde | 0.13 | 64.1 | 2-2½ |
| 20 | Butyric aldehyde | 0.13 | 46.5 | 2-2½ |
| 21 | Benzaldehyde | 0.13 | 82.6 | 2-2½ |
| 22 | None | 0.0 | 210.0 | 2-2½ |

EXAMPLES 23 TO 29

In order to illustrate the effect of changing the nature and concentration of emulsifying agent, runs were carried out substantially under the conditions of Example 10, but with emulsifiers and their concentrations approximately as indicated. The approximate effect of these variations is demonstrated in the following Table III. The results were otherwise comparable to those of Examples 1 to 16.

Table III

| Ex. No. | Emulsifying agent | Concentration | Polymer viscosity | Time |
|---|---|---|---|---|
| | | *Per cent* | | *Hours* |
| 23 | Hydr. p. v. a. 35%, made from p. v. a. of viscosity 7 cps. | 3 | 60 | 2-2½ |
| 24 | Hydr. p. v. a. 35%, made from p. v. a. of viscosity 7 cps. | 2½ | 68 | 2-2½ |
| 25 | Hydr. p. v. a. 35%, made from p. v. a. of viscosity 7 cps. | 2 | 71 | 2-2½ |
| 26 | Hydr. p. v. a. 35%, made from p. v. a. of viscosity 7 cps. | 1½ | 75 | 2-2½ |
| 27 | Hydr. p. v. a. 35%, made from p. v. a. of viscosity 7 cps. | 1 | 82 | 2-2½ |
| 28 | As for Exs. 1-18 | .75 | 150 | 2-2½ |
| 29 | As for Exs. 1-18, except using high viscosity methyl cellulose instead of gum tragacanth. | .75 | 142 | 2-2½ |

EXAMPLE 30

In order to illustrate the effect of stirring speed on polymer viscosity, the following is cited.

In this example, the conditions were substantially of the order of Example 7. In one run at a stirring speed in the neighborhood of 500 R. P. M. a viscosity of about 51.6 was achieved. In another run at a stirring speed in the neighborhood of 1,200 R. P. M. the polymer viscosity was about 140 cps. All the other conditions remained constant. The reaction time with the higher stirring speed was unchanged at about 2½ hours.

CONTROL IN GENERAL

As noted by the examples, low and high polymer viscosities may be achieved at a commercial reaction time, that is, time of reflux approximately between 2 and 2½ hours where hydrogen peroxide is the catalyst, and approximately between 2 and 5 hours where benzoyl peroxide is the catalyst. Control is exercised principally by the catalyst concentration supplemented by accelerator in the case of hydrogen peroxide, and in the case of the low viscosity resins by a reaction controlling agent. As mentioned previously and as will be explained in more detail, change in the nature and concentrations of the other constituents of the charge causes these results to vary in terms of reaction time and in terms of the characteristics of the resulting polymer.

CONTROL FOR HIGH VISCOSITY POLYMERS

With other factors substantially constant, it is seen that an increase in catalyst concentration produces a decrease in polymer viscosity, therefore, the catalyst alone, or in the case of hydrogen peroxide of the catalyst plus accelerator can be the sole factor in regulating the viscosity of the polymer where this does not throw the reaction out of control. This, however, is only applicable to relatively high viscosity polymers between 150 cps. and more. Should other constituents of the charge be varied in nature or concentration this limit will be altered.

HYDROGEN PEROXIDE CATALYST

Hydrogen peroxide is the preferred catalyst owing to its high activity, ready availability and safety. Special conditions must, however, be taken in employing this catalyst. The applicant has found that where sufficiently low quantities of hydrogen peroxide are used to give a high viscosity polymer, the reaction is impractically long, or where more catalyst is required to achieve certain viscosities in the medium and low range, hydrolysis of the monomer takes place during polymerization, the reaction is thrown out of control, or reflux is sufficiently heavy to destroy the stability of the emulsion.

It is now found that by adding an amount of an alkaline accelerator insufficient to color the polymer, the pH of the charge can be brought within the range at which the catalyst is effective to cause a relatively rapid reaction while at the same time achieving the desired high viscosity in the polymer, without appreciable hydrolysis of the monomer during polymerization. The pH range at the start of the reaction should be about between 6.5 and 9, to achieve these viscosities.

As accelerators natural mild inorganic bases such as magnesium oxide, sodium bicarbonate, sodium acetate, are preferred. Magnesium oxide must not, however, be used with "Aerosol O. T." Other suitable accelerators are: Sodium carbonate, ammonium carbonate, ammonia, sodium borate, zinc oxide, calcium stearate, zinc acetate, aluminum oxide, magnesium acetate, calcium acetate, ammonium acetate, sodium stearate, dibasic sodium phosphate.

The function of the accelerator with the use of hydrogen peroxide as catalyst is that of a neutralizer for the medium in which polymerization is to be carried out. The decomposition of hydrogen peroxide is accelerated with increasing pH value, of the mixture to be polymerized. As the hydrogen peroxide concentration is increased, the pH value decreases; consequently, the alkaline accelerator must be increased in proportion. The pH value of the mixture to be polymerized should be adjusted to approximately neutral; pH values from about 6.5 to about 9.0 are acceptable, but the preferred range is from about 6.5 to about 7.5. The finished emulsion has a pH value of approximately 5 when the pH of the initial mixture is adjusted substantially as aforesaid. An excess of accelerator (alkalinity) is undesirable, as it causes increasing saponification, coloring of the polymer, uncontrollable reaction, and impurities in the product.

Generally, the preferred concentration range of accelerator for high viscosity polymers where sodium bicarbonate is used is between about .03% and about .05% by weight of the total charge. The operative concentration range is between about .02% and about .07%. The concentrations for magnesium oxide are the same. For low viscosity resins the concentrations of sodium bicarbonate or magnesium oxide are preferred between about .05% and about .60%. In brief, the concentration of the accelerator is that necessary to bring about a pH of the emulsion at which hydrogen peroxide is sufficiently active for practical purposes and at which substantially no hydrolysis of the monomer or coloring of the polymer takes place.

Instead of hydrogen peroxide, any other peroxide catalyst may be used, as for instance, sodium perborate, acetyl peroxide, benzoyl peroxide, and other inorganic and organic peroxides.

The catalyst concentrations will be adjusted according to the viscosity desired consistent with control of the reaction. The concentration must not be enough to cause substantial hydrolysis during polymerization. For high viscosity polymers, the preferred range of catalyst concentration, where the catalyst is hydrogen peroxide is between about .02% and about .04% by weight of the monomer supplemented by an appropriate amount of an alkaline accelerator. The operative range is approximately between .01% and .07%. Concentrations of other peroxide catalysts, for instance benzoyl peroxide, will vary in proportion to their catalytic power, so that their concentrations may be calculated in terms of available oxygen from the hydrogen peroxide figures given herein. For instance, for high viscosity polymers the preferred available oxygen range is between about .010% and .018% by weight of the total charge.

CONTROL FOR LOW VISCOSITY POLYMERS

For low viscosity polymers the preferred concentration of hydrogen peroxide as the catalyst will vary between about .04% and about 1.0% (available oxygen between about .018% and .470%). The operative range of concentration is between about .03% and about 2.0% (available oxygen between about .014% and about 1%). In both these cases it is understood that the catalyst is supplemented by a controlling agent. For all viscosities the concentration of catalyst is adjusted so that the reaction time is relatively fast, that is, substantially as fast as possible consistent with the control of the reaction.

As mentioned previously, there is a maximum concentration of catalyst which can be used without throwing the reaction out of control. The applicant employs a controlling agent which permits the use of a larger amount of catalyst than otherwise possible and at the same time enables variations of the viscosity in the resulting polymer to be easily made. In this way, resins having viscosities below about 150 cps. can be prepared. Polymer viscosities from approximately 45 cps. to about 150 cps. can be achieved merely by varying the concentration of the controlling agent, in this case, acetaldehyde. For instance, in the manufacture of a polymer of viscosity about 45 cps. the acetaldehyde concentration is, under the conditions of Example 6 about 0.1%. Under the conditions of Example 9, the concentration of the acetaldehyde to achieve a viscosity of 125 cps. is about 0.03%.

The preferred range of acetaldehyde in producing low viscosity resins is between about .03% and about 3.0% by weight of the total charge. The operative range is between about .03% and about 5.0%. This will vary with other aldehydic bodies as for instance, in Exs. 19 to 22, depending on the relative effectiveness of the particular aldehyde. Butyraldehyde is more effective than acetaldehyde and benzaldehyde less effective, when the concentrations are calculated by weight. In short, the acetaldehyde is used in concentrations effective to protract a reaction, which would otherwise be uncontrollable at about ½ to about 1½ hours, to the approximate range of about 2 hours upwards. At the same time, the desirable low viscosity is achieved.

EMULSIFIER

The nature of the emulsifying agent permits a considerable variation. However, it is important to the stability of the resulting emulsion that suitable emulsifiers be employed as noted in the examples. Those preferred are partially hydrolyzed polyvinyl acetates of the hydrophilic colloidal type and certain combinations of hydrophilic colloids assisted by a surface tension depressant, as more particularly described in Collins co-pending application Serial No. 457,337, Sept. 4, 1942. Examples of suitable emulsifiers are (1) partially hydrolyzed polyvinyl acetates having an acetate group content of between about 10% and about 43% made from polyvinyl acetate, preferably from about 7 to about 15 cps. (2) A combination of two or more neutral, non-ionizable hydrophilic colloids as disclosed in Collins copending application S. N. 457,337, filed September 4, 1942, representative members of which are the following. Any of the group having a positive temperature coefficient of viscosity comprising low viscosity methyl cellulose, benzyl cellulose, partially hydrolyzed polyvinyl acetates having an acetate group content of between about 37% and about 43% with any of the group having a negative temperature coefficient of viscosity comprising hydrophilic colloidal starches, partially hydrolyzed polyvinyl acetates having an acetate group of between about 0.0% and about 35% ±2%, gum tragacanth, agar-agar, a commercial algae known as "Gomagel," gum arabic, gum acacia, and gelatin. (3) Any other emulsifying agents known in the art as capable of forming stable aqueous emulsions of polyvinyl esters or non-stable or semi-stable suspensions of these bodies as the requirements may be.

The nature and concentration of these emulsifiers has a bearing on the conditions of the reaction and also on the viscosity of the resulting polymer. Generally speaking, it is desirable to keep the concentration of the emulsifier to a minimum so as not to contaminate the emulsion produced. Where other factors are kept constant, an increase in the concentration of the emulsifier will result in a decrease of viscosity of the polymer and vice versa. The preferred range of emulsifier concentration in the case of the emulsifiers described in the examples is between about 0.75% and about 3.0% by weight of the total charge; operative range of emulsifier is generally considered as between about .75% and about 5%. When two or more emulsifiers are used according to the teachings of the Collins co-pending application S. N. 457,337, filed September 4, 1942, a total concentration of about .75% to about 1.5% is preferred with the ratio of one emulsifier to the other usually at between about 1:1 and about 2:1. This concentration will, of course, vary in accordance with the nature and concentration of other constituents of the charge, which will also vary in accordance with the nature of the emulsifier. Qualitatively, the nature of the concentration of the emulsifier is that effective to maintain the stability of the emulsion to the desired extent. Usually this concentration is kept at a minimum, having regard to the desired stability. It is possible to decrease the viscosity of the polymer through regulating the amount of emulsifying agent, but this is not thoroughly practical since any increase will contaminate the emulsion undesirably.

STIRRING

The stability of the emulsion is also tied up with the stirring speed of the agitator. Generally speaking, an increase in stirring speed will result in an increase in polymer viscosity and vice versa. The applicant has observed an increase of as much as about 100 centipoises by variation of the stirring speed between about 500 and about 1,200 R. P. M. High speed stirring is, however, not usually practical in a commercial process, so that this is not thought to be the most practical way of increasing the viscosity. The attempt is generally to keep the stirring speed down as low as possible, but it must be understood that sufficient speed is essential to emulsify the contents of the charge initially and to keep them emulsified during polymerization. The preferred order of stirring is approximately equivalent to about between 500 and about 800 R. P. M. and the operative range for commercial results between about 400 and about 1,200 R. P. M. in apparatus substantially of the type and approximate dimensions described.

SURFACE TENSION

Closely related to the emulsifier and the stirring speed in forming and maintaining the stability of the emulsion is the depression of the surface tension in the system. This may be accomplished by the use of a surface tension depressant. "Aerosol O. T." the sulphonic acid of dioctyl succinic ester is a preferred surface tension depressant and is employed in preferred concentrations of between about .10% and about .20% by weight of the total charge. The operative range is between about .05% and about .3%. An increase in concentration over the upper limit has not been found to have any more useful effect. Other surface tension depressants may be used as for instance, the other "Aerosols," "Aresklene" (dibutyl phenyl phenol sodium disulphonate), "Decerosol O. T." (dioctyl ester of sodium sulpho-succinic acid), fatty acid soaps of diethanolamine, fatty acid soaps of hydroxyethyl ethylene diamine, fatty acid soaps of "Merpentine" a sodium alkyl naphthalene sulphonate product, sulphonates of higher alcohols and alkyl aryl type wetting agents. Such surface tension depressants belong to the class known in the art as anionic surface-active agents, see J. Ind. Eng. Chem. vol. 35, pp. 107-117, 1943. A criterion of utility is that the depressant has to be compatible and non-reactive with the other constituents of the charge. The depressants mentioned are not of themselves emulsifiers but this does not preclude the use of emulsifiers which are also effective to depress the surface tension of the system.

MODIFYING AGENTS

It may also be desirable to introduce, prior or during polymerization, modifying agents such as solvents, diluents, plasticizers, etc. These modifying agents may be any of the usual plasticizers, solvents, etc. employed with polyvinyl esters. Since these agents can usually be added after polymerization has been completed, there is not thought to be any great advantage in adding them during the process. On the other hand, this invention does not preclude the addition of such agents, but it must be borne in mind that the addition of such modifiers or an increase in their concentration will result in a decrease in the viscosity of the polymer and vice versa. While these agents can be used to control viscosity, this method is not thought practical in comparison with the use of an agent such as acetaldehyde which has a definite effect at sufficiently low concentrations not to dilute the emulsion.

To achieve any noticeable effect by the use of modifiers of the solvent or plasticizer types, it is necessary to add them in large concentrations usually of about 8% or more of the charge as opposed to the very low concentrations in which modifiers of the acetaldehyde type are effective, that is, at less than about 3.0%.

Besides these, many factors effecting the reaction control and characteristics of the polymer, there are other minor factors which must be given consideration. The purity of the starting material has a bearing on the reaction rate. Usually monomeric vinyl acetate contains less than about .05% of acetaldehyde, but if more of this body is present, it will act as an inhibitor of polymerization as in the case of acetaldehyde added to the charge and will have the effect of reducing the viscosity of the polymer. Combinations of modifying factors may be employed. For example, an aldehyde may be supplemented by a diluent for low viscosity control. The diluent, which would have less effect per unit of weight, could be used for finer control. Similarly, combinations of other factors mentioned as affecting viscosity may be adjusted to achieve varying results.

Process Conditions

Certain process conditions should be observed for optimum results. The sequence of addition is generally as indicated above. It should be noted specially that the controlling agent is added initially before the start of the reaction in order that the desired controlling effect is achieved. Reflux is maintained at a moderate rate and is used principally as an indication that the reaction is proceeding. It is preferred in the neighborhood of 1% or 2%. The concentration of vinyl ester may vary within a fairly wire range, that is approximately between 35% and 65%. The preferred range is approximately between 50% and 70%.

The present invention is applicable to vinyl esters in general, particularly vinyl acetate, vinyl butyrate, vinyl propionate and vinyl chloride. Copolymerization of two or more of these esters may also be accomplished in a similar manner.

End Products

According to the above procedures, emulsions or dispersions can be made containing polyvinyl esters from the extremely low viscosities to viscosities in the neighborhood of 300 cps. Certain of these dispersions, particularly those containing low viscosity polymers cannot be obtained by prior art methods. The emulsions are in effect synthetic latices which may be employed as such, in a wide variety of uses depending on the respective viscosities of the polymers.

They may be mixed with other natural or synthetic materials to form composite bodies. Since substantially complete conversion of the monomer can be effected by these methods, the latices are characterized by their freedom from monomeric vinyl ester, generally containing less than about 5% by weight of the total charge. Since the reaction conditions prescribed favour stability, low concentrations of stabilizers, such as emulsifier, can be employed so that the resulting emulsion is low in foreign material.

The polymers may be isolated from the emulsion by removing the external phase. This may be accomplished by laying the emulsions down as films or by precipitation for instance, by the use of electrolytes such as, for example, aluminum sulphate with ammonia, or boric acid. Emulsion polymerization according to these methods is a convenient way of polymerizing vinyl esters as compared with solvent methods. No recovery apparatus need be employed. It is particularly useful where solvents are scarce.

Uses

Whether used in emulsion form or in that of the isolated polymer, the viscosity of the polymer may be regulated to suit the particular use merely by adjusting the conditions of manufacture according to the present invention.

Among the many uses to which the polymers may be applied in emulsion or solid form are the following.

As grease proof coatings for articles made of sheet fabrics such as cloth, paper and cardboard. They may be pigmented, filled and/or plasticized with the usual plasticizers for polyvinyl esters, for instance, dibutylphthalate, "3G.H." (triethylene glycol di-hexoate), etc.

For impregnating porous materials.

As adhesives and heat sealing compositions.

For compounding with other materials, for example, to give tough, resilient end products.

As vehicles for carrying metal powders, dyes, carbon black and other electrically conductive solids.

As a chewing gum base.

As a vehicle to bind pigments in coatings.

In general the presumption has been in this description that a stable emulsion is desirable. The invention can, of course, be used in the preparation of non-stable dispersions in which case the conditions, concentrations, etc. can be modified as will be understood. It has also been presumed that the desire is to carry the conversion of the monomer substantially to completion but naturally, this need not be done.

Reference is made herein to "high viscosity" polymers as those above about 150 centipoises. The term "low viscosity" polymers refers to those below this approximate viscosity.

The term "stable" is used to denote the capacity of the emulsion-emulsoid to retain its form, as such, under the conditions encountered during polymerization and during commercial handling, in contrast to the tendency of many emulsion-emulsoids to "break" under these conditions.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

I claim:

1. A process of producing an aqueous emulsion of a polyvinyl ester, said ester having a predetermined specific viscosity within the range from about 1 to about 150 centipoises (in a one molar solution in benzene at 20° C.), comprising, polymerizing the vinyl ester at a concentration ranging from about 35% to about 65% in aqueous emulsion in the presence of a peroxide catalyst effective under the temperature conditions of reaction and in the presence of acetaldehyde as a controlling agent and in the presence as an emulsifying agent of organic hydrophilic colloid active to stabilize the emulsion under the conditions encountered in emulsion polymerization and selected from the group consisting of non-ionizable colloids and gelatin and in amount of about .75 to about 5%, the peroxide catalyst being present at a concentration selected from the range to provide available oxygen of from about .014% to about .47% by weight of the vinyl ester, the amount of acetaldehyde being selected from the range from about .03% to about 3% by weight of the total charge, the amount of catalyst and controlling agent being effective to convert substantially all said vinyl ester to a polymer of said specific viscosity as the dispersed phase of the emulsion, the reaction being carried out with refluxing and the refluxing indicating the progress of the reaction, said conditions serving to maintain refluxing to a minimum.

2. A process in accordance with claim 1 wherein from about .05% to about .3% surface tension depressant selected from the group consisting of anionic surface-active agents is employed, wherein the vinyl ester is vinyl acetate, wherein the peroxide is hydrogen peroxide, and an accelerator selected from the group consisting of weak bases and the salts of weak acids is employed at a concentration of from about .05% to about .60%.

3. Process according to claim 1 wherein from about .05% to about .3% surface tension depressant selected from the group consisting of anionic surface-active agents is employed.

4. Process according to claim 1 wherein the vinyl ester is vinyl acetate.

5. Process according to claim 1 wherein from about .05% to about .3% surface tension depressant selected from the group consisting of anionic surface active agents is employed, and wherein the vinyl ester is vinyl acetate.

6. Process according to claim 1 wherein the peroxide is hydrogen peroxide and an accelerator selected from the group consisting of weak bases and the salts of weak acids is employed at a concentration of from about .05% to about .60%.

MOGENS KIAR.